(12) United States Patent
Zhang et al.

(10) Patent No.: US 9,143,407 B2
(45) Date of Patent: Sep. 22, 2015

(54) GRANULAR CLIENT INVENTORY MANAGEMENT WITH CONFLICT RESOLUTION

(75) Inventors: Chuanbo Zhang, Shanghai (CN); Jerry Liu, Shanghai (CN); Jie Du, Shanghai (CN); Huajun Luo, Shanghai (CN); Yumin Guo, Shanghai (CN); XueYin Jiang, Shanghai (CN); ZhongGang Li, Shanghai (CN); Haibing Wang, Shanghai (CN); Jie Liu, Bellevue, WA (US); Shakir Hussain Basheer, Redmond, WA (US); Yue Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 13/224,362

(22) Filed: Sep. 2, 2011

(65) Prior Publication Data

US 2013/0060924 A1    Mar. 7, 2013

(51) Int. Cl.
*G06F 15/173* (2006.01)
*H04L 12/24* (2006.01)

(52) U.S. Cl.
CPC ..................... *H04L 41/12* (2013.01)

(58) Field of Classification Search
CPC ... H04L 41/00; H04L 63/0263; H04L 63/105; H04L 41/0853
USPC ................... 709/223, 250; 715/763
See application file for complete search history.

(56) References Cited

U.S. PATENT DOCUMENTS

| 7,349,960 | B1 * | 3/2008 | Pothier et al. | 709/224 |
|---|---|---|---|---|
| 7,606,895 | B1 * | 10/2009 | Dini et al. | 709/224 |
| 7,668,953 | B1 * | 2/2010 | Sinclair et al. | 709/224 |
| 7,693,976 | B2 * | 4/2010 | Perry et al. | 709/223 |
| 7,761,346 | B2 | 7/2010 | Cooper et al. | |
| 2003/0014317 | A1 | 1/2003 | Siegel et al. | |
| 2004/0117407 | A1 * | 6/2004 | Kumar et al. | 707/200 |

(Continued)

OTHER PUBLICATIONS

"Asset Inventory Management with SCCM Expert's Inventory Manager", Retrieved at <<http://www.sccmexpert.com/docs/SCCMExpert_inventoryManager_Microsoft.pdf>>, SCCM Expert, Inc. (Microsoft system center), 2010, pp. 2.

(Continued)

*Primary Examiner* — Kevin Bates
*Assistant Examiner* — Sm Rahman
(74) *Attorney, Agent, or Firm* — Ben Tabor; Kate Drakos; Micky Minhas (57) ABSTRACT

Granular inventory management with conflict resolution at a target is provided. A client receives inventory management requests, as default settings and/or from a server. Each request includes action instance(s), which have an action key, action type, action detail(s), a precedence, and a sequence number. The client identifies a conflict if two instances have the same action type but incompatible detail(s). The client resolves the conflict, based on precedence and sometimes also on sequence numbers. The client performs the resulting action instance(s), and results are sent back for inclusion in an inventory report. Action details may specify a schedule for recurring actions. A precedence may be specified by an administrator or be built-in. Default and other requests may be defined by viewing inventory classes in a graphical user interface, entering an action based on inventory class(es), and entering target device group selection(s). Inventory classes may be captured from a live system.

20 Claims, 4 Drawing Sheets

(56) References Cited

U.S. PATENT DOCUMENTS

| | | | |
|---|---|---|---|
| 2006/0036499 | A1 | 2/2006 | Leu |
| 2006/0041567 | A1 | 2/2006 | Nilva |
| 2008/0040455 | A1 | 2/2008 | MacLeod et al. |
| 2008/0154674 | A1 | 6/2008 | Li et al. |
| 2008/0256593 | A1* | 10/2008 | Vinberg et al. .................. 726/1 |
| 2009/0164495 | A1 | 6/2009 | MacLeod et al. |
| 2011/0106942 | A1* | 5/2011 | Roskowski et al. ........... 709/224 |

OTHER PUBLICATIONS

Smeureanu, et al., "Implementing a Network Management System by creating new components and integrating already existing open-source components", Retrieved at <<http://opensourcejournal.ro/2010-Volume02/number02/paper003-fullpaper.pdf>>, In the Proceedings of Open Source Science Journal, vol. 2, No. 2, 2010, pp. 27-38.

Stuart, et al., "Collection Inventory Software", Retrieved at <<http://seniord.ee.iastate.edu/dec0401/docs/designReport.pdf>>, Apr. 6, 2004, pp. 1-66.

"Network management system", Retrieved at <<http://en.wikipedia.org/wiki/Network_management_system>>, May 27, 2011, pp. 2.

"System Center Configuration Manager: Overview", Retrieved at <<http://www.microsoft.com/systenncenter/en/us/configuration-manager/cm-overview.aspx>>, copyright 2010, pp. 2.

"System Center Configuration Manager", Retrieved at <<http://en.wikipedia.org/wiki/System_Center_Configuration_Manager>>, Mar. 23, 2011, pp. 4.

"Windows Management Instrumentation", Retrieved at <<http://en.wikipedia.org/wiki/Windows_Management_Instrumentation>>, Apr. 4, 2011, pp. 7.

* cited by examiner

GRANULAR CLIENT INVENTORY MANAGEMENT WITH CONFLICT RESOLUTION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Workstations, laptops, servers, and other computers are frequently part of a network. Smart phones, bar code scanners, other code scanners, and other mobile devices are also frequently networked. Other networked devices may range from printers and fax machines to vehicles and GPS-equipped items, for example. In short, a network may contain a wide variety of devices, whose status generally changes over time. Some networks, including some which are managed by a large business, government agency, educational institution, or other enterprise, contain thousands or even tens of thousands of devices.

Network management systems (NMS) are sometimes used to discover a network's inventory of devices, to monitor the health and status of networked devices, and to provide alerts when conditions appear likely to impact network performance. An NMS may help administrators and other users identify problems and their sources, and help prevent problems. Some NMS systems also collect device statistics over time, such as resource (memory, processor, disk, battery, etc.) usage and performance. An NMS may also read and/or write device configurations, check for and/or distribute software updates, and provide security through device tracking, for example. Various protocols are used to gather information from the devices in a managed network.

SUMMARY

In some managed networks, particularly large ones such as enterprise networks, a given device may receive conflicting, redundant, and/or otherwise inefficient requests from network management system(s). Some embodiments described herein provide granular inventory management with conflict resolution at a target device, thereby increasing the efficiency of network management.

In some embodiments, a client residing in the memory of a target device electronically receives multiple inventory management requests. Requests may be from a local store of default requests and/or may be received from a server across a network connection. Each received request includes at least one action instance, and each action instance has at least an action type, action detail(s), a precedence, and a sequence number.

Some embodiments provide or utilize an action key. The action key is declared on the server side, thereby providing administrative freedom to decide which action attribute or combination of attributes will define the action key, and influence over conflict resolution on the client side. If an administrator wants certain information to be merged, then a corresponding action key is declared and given the different values for that merger, and on the client side all such instances will get merged. If an administrator wants certain information to be an override (or be overridden), then a corresponding action key is declared for the attribute to be used at the client side as an override value.

In some situations of interest, the client computationally identifies a conflict, in that two received requests contain respective action instances having the same action type but having different action detail(s). The client computationally resolves the conflict in favor of one action instance, based at least on action instance precedence; sequence numbers may also be used in some conflict resolutions. Then the client performs the action instance in whose favor the conflict was resolved. In some cases, the client also encounters and performs an action instance which poses no conflict because it occurs only once in the received requests.

In some embodiments, an action type may call for an action to gather a device statistic such as amount of available memory, current antivirus software information, or battery power level, to name just a few of the possibilities. Action details may specify a schedule for a recurring action, or specify which information to gather, e.g., version number and install date when the action type is "collect software information". Again, these are merely examples. A precedence may be specified by an administrator or be a built-in default; precedences are used in some situations to resolve conflicting requests. A sequence number can be a timestamp, or any other substantially monotonic sequence of values; sequence numbers may be used to resolve conflicts when precedences are equal. If a sequence number has expired, or indicates an invalidated inventory management policy as source, then the client determines that the action instance is no longer valid, and revokes the action instance without satisfying the request.

From an administrator's perspective, some embodiments include defining a first electronic inventory management request set, by (i) viewing inventory classes in a software graphical user interface on an administrative computing device display, (ii) entering in the user interface at least one inventory management request action based at least in part on inventory class(es), (iii) entering a first target device group selection in the user interface, and (iv) defining inventory classes from a live reference system or by import/export. In addition, some of these embodiments include defining a second electronic inventory management request set, by (i) viewing inventory classes in the user interface, (ii) entering in the user interface at least one inventory management request action based at least in part on inventory class(es), and (iii) entering a second target device group selection in the user interface. Some embodiments provide a server-side default set of inventory management requests.

In some of these embodiments, the first target device group selection identifies at least some live target devices, that is, devices which are currently connected to the network and available for use by authorized user(s). In some, the two target device groups share at least one live target device, and thus present the possibility that the device will be sent conflicting requests. In some, the first and second inventory management request sets differ from one another with respect to that shared target device.

Some of the embodiments include sending the inventory management request sets electronically over a network from the administrative computing device to a group of devices which includes at least some of the target devices. Some include obtaining over the network at the administrative computing device an electronic report containing inventory report results, such as conflict-resolved results, from inventory management requests which were actually applied at target devices. When requests conflict, not every request is actually applied. Also, a report may include results from a default inventory management request which is stored at the target device and so was not present in the request sets sent from the administrative computing device. Thus, the inventory management requests sent from the administrative computing device to the shared target device may be different than inventory management request(s) which were actually applied at the shared target device.

With some embodiments, an administrator may specify in the user interface a precedence for an inventory management request relative to other inventory management requests. With some, granular control may be exercised, such as by selecting particular inventory classes and/or by turning off a property of an inventory class (or several properties) so a result for that property (or properties) will not be present in the obtained report.

From a wider perspective, some embodiments include an administrative computing device having a logical processor, a memory in operable communication with the logical processor, and administrative inventory management software residing in the memory and executable with the processor. The administrative inventory management software has a list of inventory classes managed by an administrator (add/remove classes, import/export to another management system), a list of target devices, a user interface, and code for generating granular inventory management requests based on inventory classes and target devices specified with the user interface, as well as inventory class settings to turn on/off the report for one or more properties for a class. Also present are a plurality of managed clients, with each client residing in a memory of a respective target device. Each client has an inventory request conflict resolution mechanism which executes to computationally resolve conflicts, e.g., between inventory requests which have the same action type but different action detail(s), or requests with the same type, same or different action key, and different action details.

In some cases, an enterprise-level number of managed clients is present, namely, at least one thousand managed clients. Some embodiments comply with at least one of the following standards: Web-Based Enterprise Management, Common Information Model. In some embodiments, the inventory request conflict resolution mechanism resolves conflicts based on action instance precedence and request sequence number. Some embodiments include a server-side inventory policy provider to generate inventory policy, which may be department-specific (a.k.a. dimension-specific), for example. In some, mobile target devices are present with respective clients, and in some computer target devices are present with respective clients. Some include mobile target device policy provider(s), and/or computer target device policy provider(s). Some embodiments include a set of inventory management requests generated by the administrative inventory management software, as well as a different set of inventory management requests which were actually applied by the clients after resolution of conflicts.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Network management systems provide capabilities such as remote control, patch management, software distribution, operating system deployment, network access protection, and hardware and software inventory. Familiar tools and techniques can be helpful. However, some familiar network management approaches call for an administrator to manually define inventory settings, e.g., using a text editor. Relying on manual entry of textual inventory settings in a particular syntax increases the risk of errors, and may be difficult to learn. Moreover, in some familiar approaches, clients and devices are managed separately, rather than as part of a unified solution. In some, a client is tightly bound to a particular management server, so that providing additional granularity of control involves adding more servers.

Difficulties and drawbacks of existing management approaches are amplified when thousands of devices are part of a managed network. Indeed, some managed enterprise networks contain hundreds of thousands of devices. Accordingly, inventory management can be an important aspect of network management. In order to retrieve client device information, including hardware and software characteristics and status, at a management server, an administrator specifies inventory settings in some manner. Thus, administrators would benefit from improved ways to define inventory settings to collect data from clients, as opposed to manually building an inventory model using a text editor. Administrators would also benefit from more granular control which targets settings to groups of clients in a unified and dynamical way.

Some embodiments described herein provide a smooth user experience for defining inventory settings in a current display of a live-reference system. Some include an inventory schema defined prior to the inventory settings. The inventory schema can provide inventory class definitions, with property(ies) and their data type(s) for inventory classes. Inventory settings can be used to turn on/off properties for use in a particular set of inventory requests. The inventory schema may be global to all inventory settings and change less frequently than the inventory settings. In some embodiments, the display is current in that it accurately shows data of the live-reference system. Support dynamically targeting settings to dynamic collections (e.g., a list of target devices) created on the basis of a query rule for client dimensions such as which department is responsible for a device. Some embodiments automatically resolve conflicting inventory requests at the target device when a targeted client belongs to multiple dimensions. In addition to improving the efficiency and accuracy of inventory management, resolving requests at the client side also helps free clients from being tightly bound to a particular management server.

Some embodiments provide a granular client inventory management system, with a natural-feeling user experience to extract inventory schema data and model it from a reference system (a system of live-reference devices), an ability to build run-time collections and target inventory settings for multi-dimensional clients, and automatic conflict resolution at the client side. An editor, such as a Managed Object Format (MOF) editor, allows creation of an inventory data schema by live-reference in a system, e.g., by connecting to a live-reference device and retrieving an inventory schema for an administrator to choose from. An inventory class selection mechanism, such as an inventory class picker, allows an administrator to turn on/off data items (e.g., inventory class property(ies)) in settings to control collecting of the items, which can be assigned to collections of targeted devices.

Some embodiments described herein may be viewed in a broader context. For instance, concepts such as conflict, precedence, actions, requests, and inventory may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving conflict, precedence, actions, requests, and/or inventory are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Client" means a managed unit, and "device" means the hardware of a managed unit. These may be the same thing in practice. But in some cases a managed device has multiple managed clients, e.g., a managed server machine may have several clients such as a router, a firewall, and a DNS server, each of which has different inventory class properties and/or is subject to different inventory management requests. An inventory agent may be part of a client, and thus reside on or be accessible to a device.

"Live-reference system" means a collection of one or more devices or machines from which live-reference data in the form of inventory class definition(s) is obtained or can be obtained. A target device may be part of a live-reference system, but in practice the live-reference system will often be smaller than the collection of managed target devices. An administrative device could be used as (part of) a live-reference in some cases.

"Computationally" means a computing device (processor plus memory, at least) is being used, and excludes obtaining a computational result by mere human thought or mere human action alone. For example, doing arithmetic with a paper and pencil is not doing arithmetic computationally as understood herein.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)", "(es)" or "(ies)" means that one or more of the indicated feature is present. For example, "class(es)" means "one or more classes" or equivalently "at least one class".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as configuring, defining, determining, displaying, entering, generating, identifying, listing, obtaining, performing, receiving, resolving, revoking, sending, specifying, turning on/off, viewing (or configures, configured, defines, defined, determines, determined, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

Figure 1:
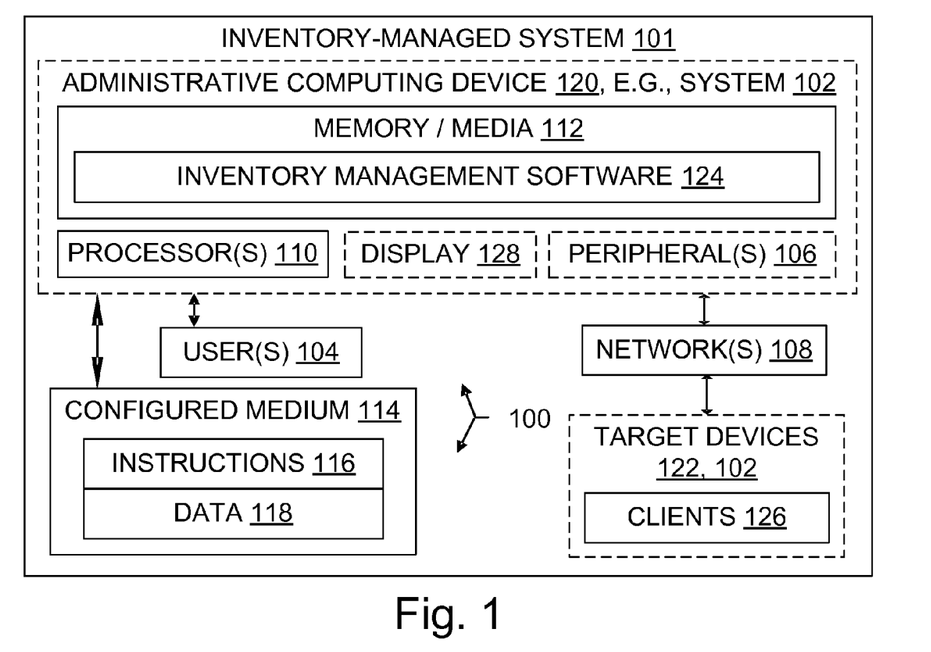
FIG. 1 is a block diagram illustrating an inventory-managed system having inventory management software on an administrative computing device, clients on managed target devices, and other items in an operating environment which encompasses multiple network nodes, and also illustrating configured storage medium embodiments.

With reference to FIG. 1, an operating environment 100 for an embodiment may include an inventory-managed system 101. The inventory-managed system may include one or more administrative computing devices 120 and managed target devices 122. The administrative computing device 120 and the managed target devices 122 each include a computer system 102, which may be a multiprocessor computer system. An operating environment may include one or more machines in a given computer system 102, which may be clustered, client-server networked, and/or peer-to-peer networked. Computers and other machines in a system 101 may be local, in a cluster, and/or in a cloud. An individual machine is a computer system, and a group of cooperating machines is also a computer system, for example. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, network administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the inventory-managed system 101 or with another system embodiment using one or more connections to a network 108 via network interface equipment, for example. Network 108 may include one or more firewalls, and may be internet-facing or an intranet, for example.

A computer system 102 includes at least one logical processor 110. Each illustrated computer system 102, 120, 122, like other suitable systems, also includes one or more computer-readable storage media 112, although for convenience this is not shown in every system 102 of FIG. 1. Media 112 may be of different physical types. The storage media 112 may be volatile memory, non-volatile memory, fixed in place media, removable media, magnetic media, and/or optical media, as opposed to media that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by inventory management as discussed herein, e.g., by binding, conflict resolution, creation, deployment, display, execution, loading, modification, performance, and/or other operations. In particular and without limitation, data 118 may include a database, stored on one or more machines, which includes inventory information and related data.

Administrative inventory management software 124, client inventory management software 126 (also referred to as client 126), other software, and other items shown in the Figures and/or discussed in the text may reside partially or entirely within one or more media 112, thereby configuring those media. In addition to processors 110 and memory 112, an operating environment may also include other hardware, such as displays 128, buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
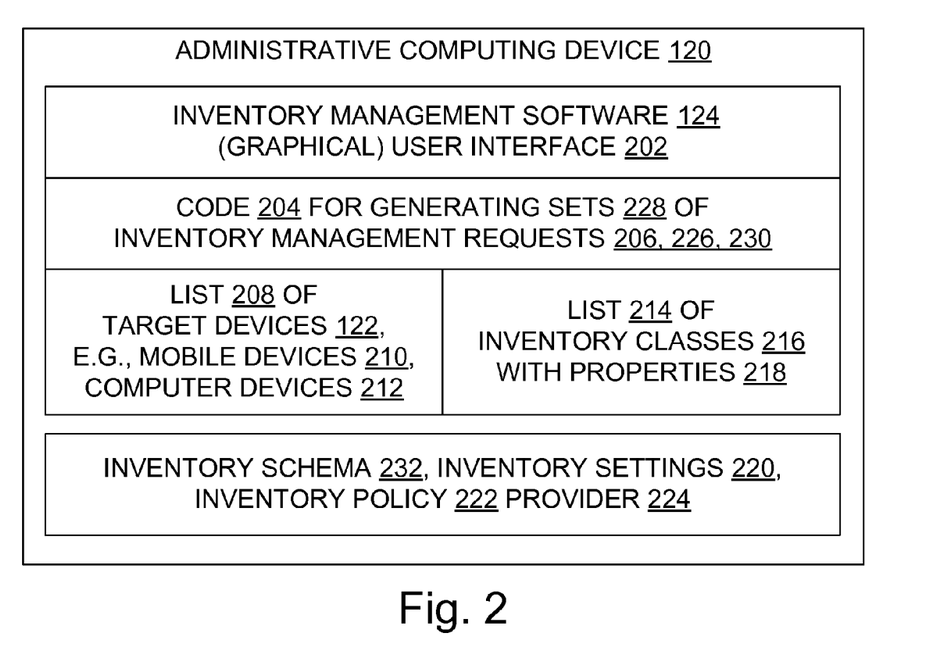
FIG. 2 is a block diagram illustrating an administrative computing device for inventory management in an example architecture.

FIG. 2 illustrates an administrative computing device architecture which is suitable for use with some embodiments. Administrative inventory management software 124 includes a user interface 202, such as a graphical user interface, as well as code 204 for generating inventory management requests 206 for transmission to clients 126. Inventory management requests 206 (also referred to as inventory requests 206, management requests 206, or requests 206) make specific requests of specific clients. Requests 206 in general may include generated requests 226, server-side default requests 230, and/or client-side default requests 304. The server-side default inventory management request 230 set is applied for all target devices connected to this network system 101. The client-side default requests 304 are client-specific. From an administrator's perspective, one could easily manage the server side default inventory management request and it is dynamic, easy to change at one central location.

In some embodiments, granularity of requests 206 is provided in part by basing the requests on selections made from a list 208 of target devices 122, such as mobile devices 210 and/or computer devices 212. Granularity of requests 206 is also provided in part by basing the requests on selections made from a list 214 of inventory classes 216 which have respective properties 218. The lists 208, 214 can be displayed to an administrator 104 in the graphical user interface 202, for example, obviating manual textual entry of inventory settings. Target devices 122 may have characteristics (a.k.a. dimensions) such as which department assumes responsibility for them, as well as characteristics based directly on their hardware and software components. Administrator selections may be guided by and/or memorialized in settings 220 within an inventory policy 222 which has a corresponding provider 224 as interface to the code 204. Settings may be based on an inventory schema 232. Settings 220 are one way to implement requests 206; other data structures may also be used to implement requests, e.g., structs, records, lists, or XML.

Figure 3:
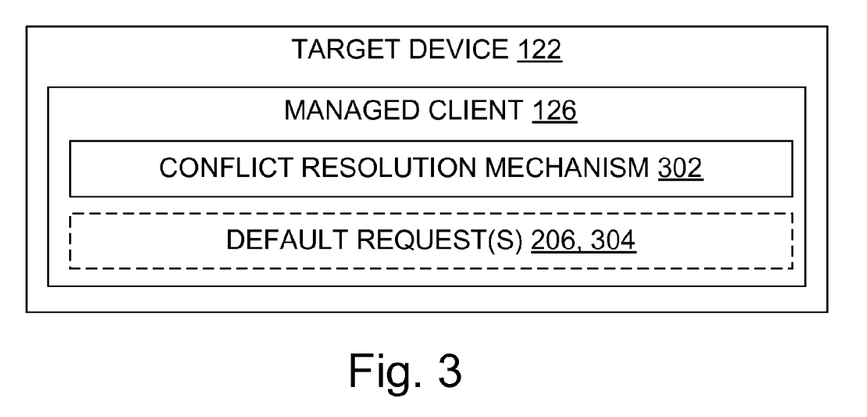
FIG. 3 is a block diagram illustrating a managed target device in an example architecture.

FIG. 3 illustrates a target device architecture which is suitable for use with some embodiments. Managed client 126 software includes a conflict resolution mechanism 302, for resolving conflicts between management requests 206. The client 126 may also include (or equivalently, access) locally stored requests 304, which were not transmitted from the administrative device 120 in a given set of requests 226 but instead were generated previously by the client, or placed previously in storage on the client.

Figure 4:
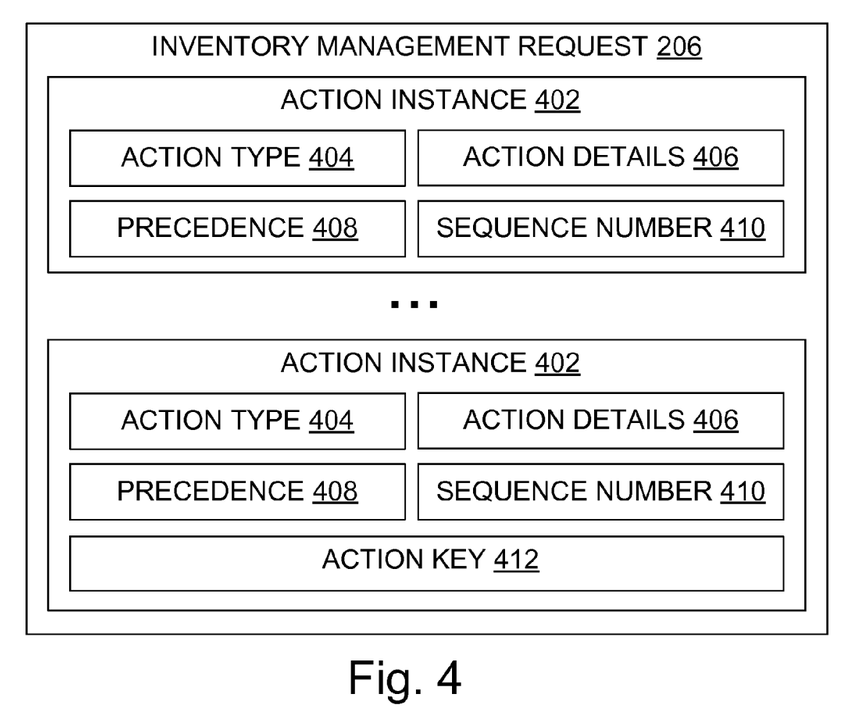
FIG. 4 is a block diagram illustrating inventory management requests in an example architecture.

FIG. 4 illustrates an inventory management request 206 structure which is suitable for use with some embodiments. A request 206 includes one or more action instances 402. Each action instance includes an action type 404, action details 406, a relative order or other precedence 408, and a timestamp or other sequence number 410. Other request 206 contents may include source and destination addresses, checksums, digital certificate, digital signatures, and other familiar items.

In addition to, or in place of, and action instance, a request 206 may include an action key 412 which is located in an action instance 402, for example, or otherwise associated with an action instance 402 and/or with a request 206. In some embodiments, an action key is declared on the server side (e.g., at administrative computing device 120), thereby providing administrative freedom to decide which action attribute (e.g., property 218) or combination of attributes will define the action key. Action keys 412 provide an administrator with influence over conflict resolution on the client side.

For example, if an administrator 104 wants certain information to be merged 642, then in the server side a corresponding action key is declared and given the different property/class values for that merger, so that on the client side all such instances will get merged without conflict resolution eliminating any of them. Some embodiments use merge 642 when request could logically be merged, e.g., suppose request A specifies collecting information X while request B specifies collecting other information Y. Then one could merge requests A and B and collect both pieces of information X and Y. If an administrator wants certain information to be an override 644, then in the server side a corresponding action key 412 is declared for the attribute (e.g., property 218) to set the same value for, and after this action key comes down to the client side, it will provide an override.

In some embodiments, a user 104 can specify 632 in the user interface 202 an action key 412 for inventory management requests, with the action key specifying at least one of the following: merger properties 218, an override property 218. An action type could be used in a somewhat similar manner, but would provide different granularity for controlling conflict resolution. In one embodiment, some classes all have the same action type of InventoryDataItem, but different action keys for DataItemID give flexibility, as the client side uses the same ActionType to handle them in common. In some embodiments, merge 642 allows a client to satisfy as many requests 206 as possible, and allows an administrator to manage clients with more granularity and flexibility of control freedom by combining different request criteria.

As an example of conflict resolution, assume four granular settings have been defined, in order of increasing precedence: Collect Installed Software, Schedule—3 days, Schedule—30 days, Collect Battery Info. Assume also that two target device groups have been specified: R&D (Research & Development, and example of a business group or department), and Mobile Phone (an example of a direct characteristic of client device(s)). Assume that the first two settings are applied to generate inventory requests targeting the R&D group, and the last two settings are applied to generate requests 206 that target the Mobile Phone group. Then an R&D Mobile Phone device (a device used by an employee in the R&D group) will receive conflicting requests, since different schedules are requested. Using precedence, the resulting requests (settings) applied at the R&D Mobile Phone device 122 will be Collect Installed Software, Schedule—30 days, Collect Battery Info.

With reference to FIGS. 1 through 4, some embodiments provide a computer system 102 with a logical processor 110 and a memory medium 112 configured by circuitry, firmware, and/or software to perform granular inventory management as described herein.

In some embodiments, an inventory-managed system 101 includes an administrative computing device 120 having a logical processor 110 and a memory 112 in operable communication with the logical processor. Administrative inventory management software 124 residing in the memory is executable with the processor. The administrative inventory management software 124 has a list 214 (i.e., table, linked list, or other set) of inventory classes 216, a list 208 (table, etc.) of target devices 122, and a graphical user interface 202. The software 124 includes code 204 for generating granular inventory management requests 206 based on inventory classes 216 and target devices 122 which are specified with the user interface 202.

Some embodiments also include managed clients 126. Each client resides in a memory 112 of a respective target device 122; target devices are part of some embodiments and not part of others. Each client has an inventory request conflict resolution mechanism 302 (also called a conflict resolver 302), which executes to computationally resolve conflicts between inventory requests that have the same action type 404 but have different—and conflicting—action detail(s) 406.

In some embodiments, the system 101 includes an enterprise-level number of managed clients, namely, at least one thousand managed clients 126. Some embodiments include at least ten thousand managed clients 126, some include at least fifty thousand, and some include at least one hundred thousand managed clients 126. The target devices 122 may be mobile target devices such as smart phones and portable optical code scanners, for example. Target devices may alternately or in addition include computer target devices, such as workstations, laptops, slates, and servers.

In some embodiments, the system 101 as a whole, and/or some of its components such as target device(s) 122, complies with industry standard(s), and in particular complies with at least one of the following standards: Web-Based Enterprise Management, Common Information Model. For example, some embodiments utilize Microsoft® Windows Management Instrumentation (WMI) (mark of Microsoft Corporation), in implementation of these standards. More generally, familiar standards and protocols for network communications may be used, such as HTTP, XML, SNMP, and so on.

In some embodiments, the inventory request conflict resolution mechanism resolves conflicts based solely on action instance precedence 408, while in some conflicts are resolved based on action instance precedence 408 and request sequence number 410.

Some embodiments include an inventory policy 222, and a policy provider 224. Policies 222 may be implemented in schemas, registries, XML, and/or with other familiar mechanisms adapted to support inventory management as described herein, and may reference or include inventory schema(s) and/or inventory schema extension(s).

Some embodiments include a set of inventory management requests 206, 226 generated by the administrative inventory management software 124, and also include a different set of inventory management requests 206 which were actually applied by the clients 126 after resolution of conflicts.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, clients 126 may reside on multiple devices/systems 102 in a networked cloud, policies 222 may be stored on yet other devices within the cloud, and the administrative inventory management software 124 may configure the display on yet other cloud device(s)/system(s) 102.

Processes

Figure 5:
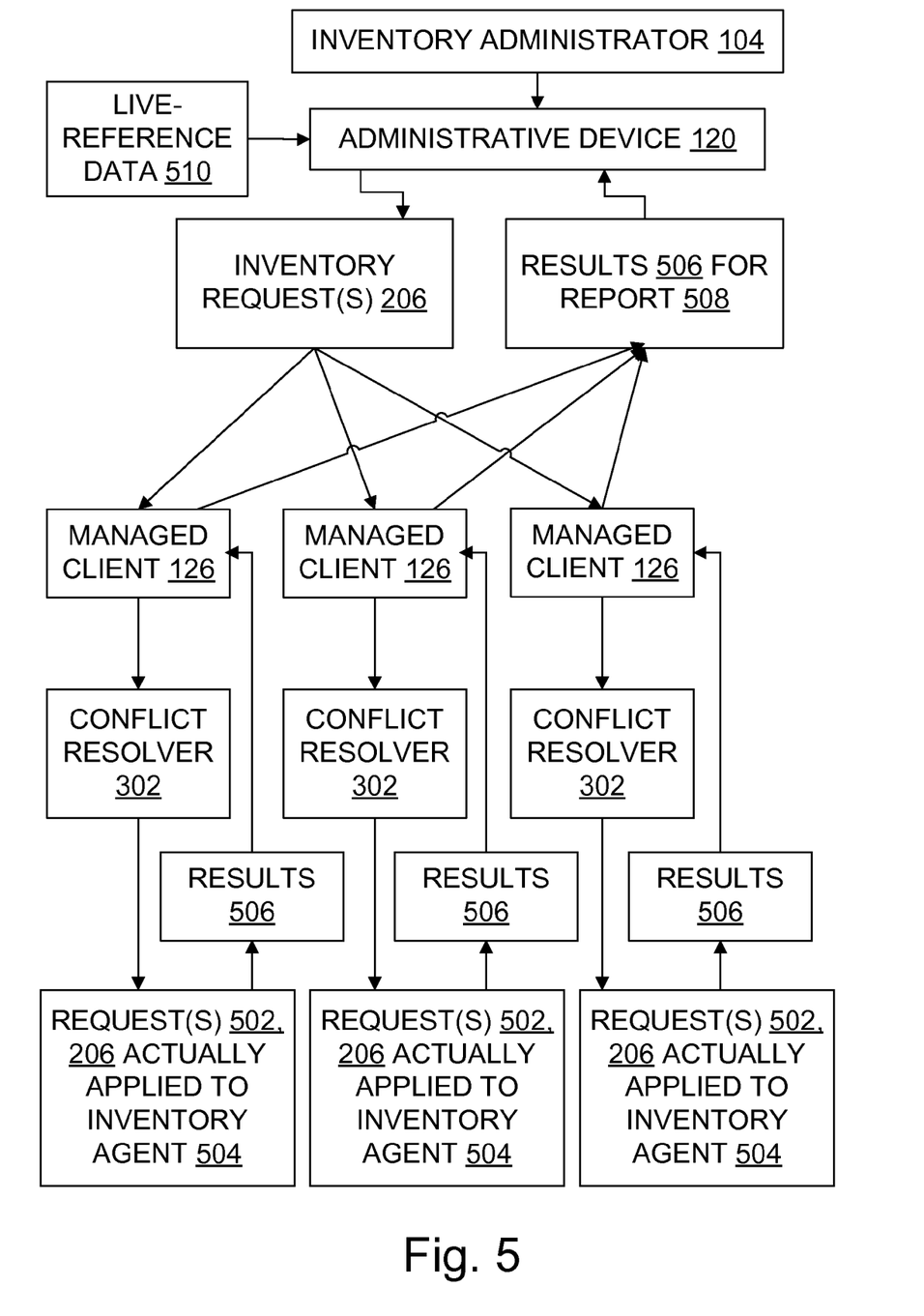
FIG. 5 is a data flow diagram illustrating granular inventory management with conflict resolution in an example architecture.

FIG. 5 illustrates data flow in some embodiments. Live-reference data 510 is obtained 648 by an administrative device 120. An administrator enters inventory class 216 selections and target device 122 selections through a command line or graphical user interface using software 124 on an administrative device 120 such as a server. Code 204 generates requests 206 and sends them over network(s) 108 to managed clients 126. Conflict resolvers 302 on the target devices resolve any conflicts between received requests 206, and apply non-conflicting requests 502, 206 to WMI or another inventory agent 504. Results 506, such as configuration details and resource statistics, are handed to the client 126 by instrumentation and/or other inventory agent 504, and transmitted back over the network to be placed in a report 508 for the administrator 104.

Figure 6:
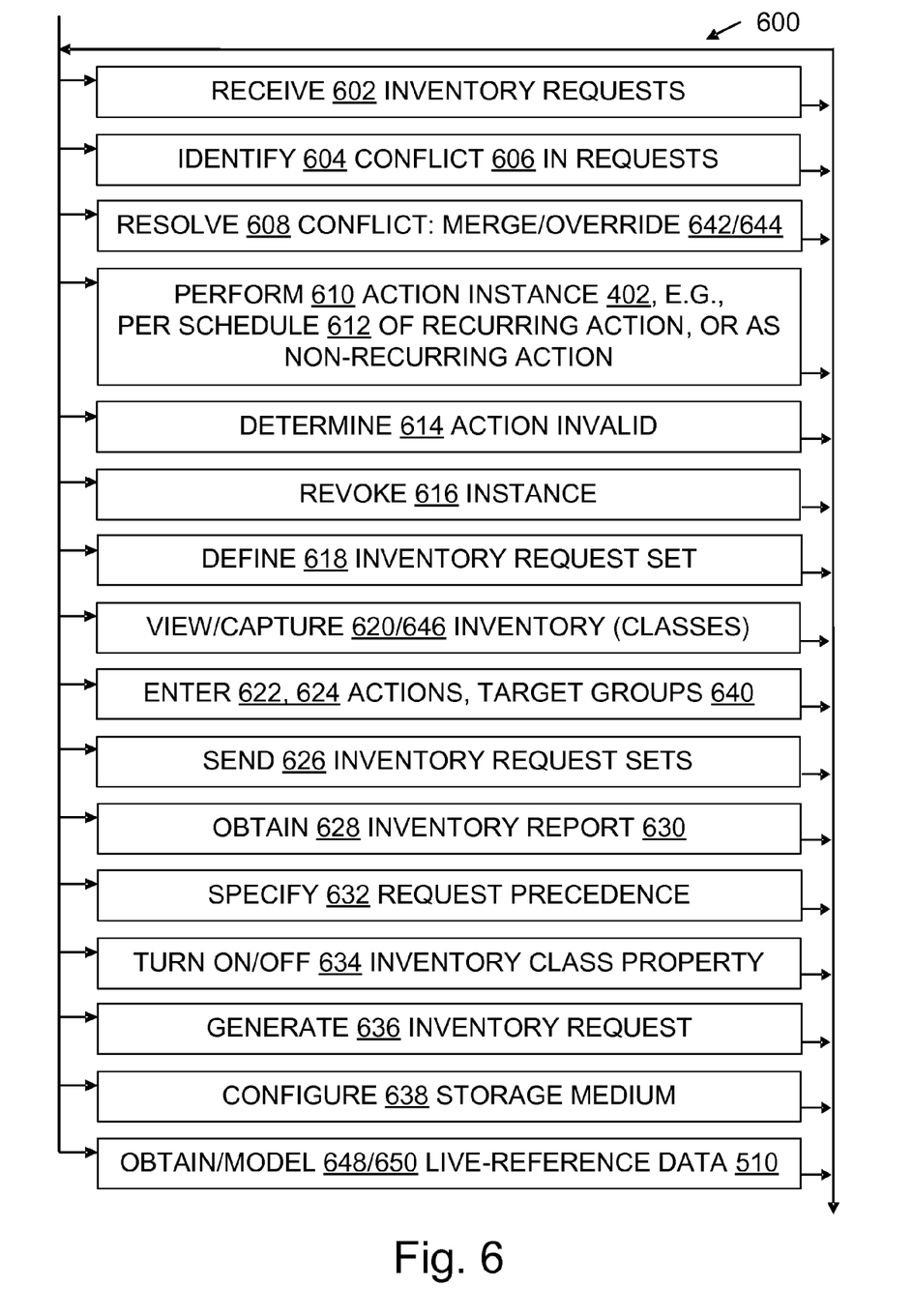
FIG. 6 is a flow chart illustrating steps of some process and configured storage medium embodiments.

FIG. 6 further illustrates some process embodiments, in a flowchart 600. Processes shown in the Figures may be performed in some embodiments automatically, e.g., driven by software 124 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 6. Steps may be performed serially, in a partially overlapping manner, or fully in parallel. The order in which flowchart 600 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an inventory request receiving step 602, an embodiment receives inventory request(s) 206. Step 602 may be accomplished using familiar networking mechanisms to read requests 226 sent from the administrative device 120, for example. Step 602 may also read locally stored default requests 304.

During a conflict identifying step 604, an embodiment identifies a conflict 606 in received requests 206. Step 604 may be accomplished by sorting or otherwise organizing requests 206 according to action type 404 and then checking for mutually inconsistent action details 406 within a given action type, for example.

During a conflict resolving step 608, an embodiment selects action details 406 from among conflicting requests 206. Step 608 may be accomplished using the relative precedence 408 of conflicting action instances, by selecting the details 406 of the instance 402 which has the greatest precedence. If the precedences are equal, step 608 chooses the details 406 of the action instance whose sequence number 410 is greatest. In some embodiments, the conflict is resolved at the client side. In some, the conflict is not resolved at client side, but is instead resolved 608 at an administrative server side, or on a proxy server. One example involves a mobile device 210, which has limited computing resource and battery, so instead of code on the device, code on a proxy server is used to perform conflict resolution. That is, conflict resolution mechanism 302 may reside on a target device 122, on a proxy server 102, and/or on an administrative device 120, in a given embodiment.

It will be understood that other approaches which reverse assumptions about greatest versus least values being favored are equivalent. For example, during step 608 an embodiment could favor selection of an instance 402 with the least precedence rather than the greatest precedence, could favor selection of an instance 402 with the least sequence number rather than the greatest sequence number, or could favor selection both of the least precedence and of the least sequence number. That is, one embodiment may embody an approach which assumes that having a higher precedence 408 value (e.g., five on a scale of one to five) means an instance is more likely to be selected and performed in the event of a conflict, while another embodiment's approach assumes that having a lower precedence 408 value (e.g., one on a scale of one to five) means an instance is more likely to be selected and performed in the event of conflict. For present purposes, these approaches are equivalent.

During an action performing step 610, an embodiment performs an action instance 402. Step 610 may be accomplished using an inventory agent 504, or other mechanism, for example. Step 610 may include a one-time action, such as installing a particular software patch, or a recurring action performed according to a schedule 612, such as recording a battery level each night for fifteen consecutive nights.

During an invalidity determining step 614, an embodiment determines that a request 206 is invalid. Step 614 may be accomplished by noting that the request was issued on the basis of an expired policy 222, for example.

During an instance revoking step 616, an embodiment revokes an invalid request 206. Step 616 may be accomplished by excluding the invalid request from consideration as a candidate for performance 610, for example.

During an inventory request set defining step 618, a user (or an embodiment operating on behalf of a user) defines a set of inventory requests 206, 226. Step 618 may be accomplished using a graphical user interface 202, or other mechanism, for example.

During an inventory class viewing step 620, a user (or an automated agent operating on behalf of a user) views an inventory class 216 and/or an inventory in the form of a list of target devices 122. Step 620 may be accomplished using a graphical user interface 202, or other mechanism, for example.

During an action entering step 622, a user (or an embodiment operating on behalf of a user) enters data for an action instance 402 or portion thereof, using a graphical user interface 202, for example, to select action type 404, details 406, and (in some cases) precedence 408. In some embodiments, action type 404 is modeled from inventory classes 216 by using live-reference data 510. Sequence numbers 410 are generated automatically.

During a target entering step 624, a user (or an embodiment operating on behalf of a user) enters data for target device(s) 122. Step 624 may be accomplished using query mechanisms of an interface 202 to define a set of targets based on their dimensions, and/or other mechanisms, for example.

During an instance request sending step 626, a user (or an embodiment operating on behalf of a user) sends requests 226 toward networked clients 126, using network(s) 108.

During an inventory report receiving step 628, a user (or an embodiment operating on behalf of a user) receives an inventory report 630 containing results 506 from performance 610 of requests 206 at target devices 122. Results 506 from different clients may be aggregated, summarized, visualized, and/or otherwise manipulated by familiar reporting mechanisms adapted to work with results 506.

During a precedence specifying step 632, a user (or an embodiment operating on behalf of a user) specifies precedence 408 value(s), e.g., using an interface 202, autogeneration, default value(s), and/or a configuration file.

During a property use controlling step 634 (also called property turning on/off step 634), a user (or an embodiment operating on behalf of a user) turns on or turns off usage of at least one inventory class property 218 for the purpose of generating 636 inventory requests 206, e.g., within an interface 202.

During an inventory request generating step 636, a user (or an embodiment operating on behalf of a user) generates inventory requests 206 based on user-specified target devices 122 and inventory classes 216. Step 636 may be accomplished using software 124, for example.

During a memory configuring step 638, a memory medium 112 is configured by a conflict resolution mechanism 302, a report 508 based on results 506 after conflict resolution 608 at clients 126, or otherwise in connection with granular inventory management as discussed herein.

During an inventory class capturing step 646, an embodiment captures inventory information such as inventory classes 216 and/or a list of target devices 122 to include or exclude, which represents a live reference system 101. That is, in some embodiments the inventory information that is captured represents devices 122 currently in the system of managed devices and/or represents the properties of such devices. "Inventory information" includes inventory classes but could also include more, such as which target devices to ignore, or which target devices are the most important to collect from.

During a live-reference data obtaining step 648, an embodiment obtains live-reference data 510. Step 648 may be accomplished by connecting to the live reference system and extracting a list of inventory class definitions as live-reference data from the reference system, using applicable standards as desired. An administrator can then identify and choose the inventory class(es) which the administrator intends to use in collecting inventory information from other target device groups which share such classes with this reference system. An inventory class definition can identify what installed hardware and/or software or other information to collect for with requests 206, and may specify how or where to collect that data in the target device. In some cases, an inventory class includes Namespace attribute(s) that identify where to collect the information, a Class Name that identifies what class inside that Namespace to collect the information for, and one or more class properties that include detailed information for this inventory class.

During a live-reference modeling step 650, an embodiment models inventory information. During the obtaining step 648 in some embodiments, the inventory class schema information is returned as a list of inventory classes to let an administrator choose and confirm what to collect. After the administrator identifies one or several inventory classes to collect data regarding on the target device, the administrator confirms the selection, and the administrative inventory software saves the administrator's selection and merges it into the existing inventory class schema definition, to allow further usage in creating default or custom settings, as the source of list of inventory classes.

The foregoing steps and their interrelationships are discussed in greater detail below, in connection with various embodiments.

Some embodiments provide a process for inventory management. From a client perspective, the process includes electronically receiving 602 multiple inventory management requests 206 in a device 122 memory 112. Each received request 206 includes at least one action instance 402 and/or at least one action key 412. Each action instance has at least an action type 404, action detail(s) 406, a precedence 408, and a sequence number 410. The process also includes computationally identifying 604 a conflict, in that received request(s) 206 contain respective action instances 402 having the same action type 404 but having different and mutually inconsistent action detail(s) 406. The process computationally resolves 608 the conflict in favor of one action instance 402, based at least on an action instance precedence 408. In some cases, resolving 608 the conflict is based on an action instance precedence and also on action instance sequence numbers, e.g., when precedences are the same but sequence numbers differ. If precedences match, and sequence numbers also match, then the action instances may be invalidated and revoked 616.

Some embodiments include computationally performing 610 the action instance in whose favor the conflict 606 was resolved. In some cases, a process also computationally performs 610 an action instance which occurs only once in the received requests. In some, the action detail(s) 406 include a schedule 612 for a recurring action.

In some embodiments and situations, the client receives 602 a locally stored request from a default inventory policy. In some, the client receives 602 a transmitted request from a server across a network connection.

From an administrator 104 point of view, some embodiments provide an administrative process for inventory management, including defining 618 a first electronic inventory management request set 228, by four phases. A first phase is obtaining 648 live-reference data 510 and modeling 650 from it. A second phase is viewing 620 inventory classes 216 in a software graphical user interface 202 on an administrative computing device 120 display 128. A third phase is entering 622 in the user interface at least one inventory management request action (e.g., action instance 403 or portion thereof) based at least in part on inventory class(es) 216. A fourth phase is entering 624 a first target device 122 group 640 selection in the user interface 202. In some embodiments, the target device group selection identifies at least some live target devices 122, using live reference data 510. Of course, embodiments may omit part or all of any of these phases, and may include other steps or phases. In some embodiments, for example, a server-side default inventory request management process includes only two phases, namely, the first and second phases described above. Default requests 304 are used instead of the third phase, and all devices 122 managed by the system 101 are targeted, avoiding the fourth phase.

Some embodiments of the administrative process also include defining 618 a second electronic inventory management request set 228, by viewing 620 inventory classes in the user interface, entering 622 in the user interface at least one inventory management request action based at least in part on inventory class(es), and entering 624 a second target device group selection in the user interface. In some cases, the target device groups 640 share at least one live target device 122, and the first and second inventory management request sets 228 differ from one another with respect to that shared target device.

Some embodiments also include sending 626 the inventory management request sets 228 electronically over a network 108 from the administrative computing device 120 to a group of devices which includes at least some of the target devices 122. Some include obtaining 628 over the network at the administrative computing device an electronic report 630 containing inventory report results 506 from inventory management requests 502 which were actually applied at target devices 122. Some requests sent from the administrative computing device are not performed at the target device, because they lose out to another request during conflict resolution or get overridden, so inventory information their performance would have resulted in is not generated and thus sent back to the administrative computing device.

The inventory management requests 226 sent from the administrative computing device to the shared target device can be different than inventory management request(s) 502 which were actually applied (performed 610) at the shared target device. In some, the administrator 104 obtains 628 a conflict-resolved result 506 in response to conflicting inventory management requests sent from the administrative computing device. In some, the administrator 104 obtains 628 a result from a default inventory management request 304 that was not present in the request sets 228 sent from the administrative device 120. Some embodiments provide or utilize either or both of the following: static client default requests 304, dynamic server-side default requests 206 which are applied, e.g., to all managed clients 126 in the system 101 (an administrator 104 may change this default).

Some embodiments include specifying 632 in the user interface a precedence for an inventory management request relative to other inventory management requests. Some include turning off 634 a property 218 of an inventory class, and thus a result for that property is not present in the obtained report.

Configured Media

Some embodiments include a configured computer-readable storage medium 112. Medium 112 may include disks (magnetic, optical, or otherwise), RAM, EEPROMS or other ROMs, and/or other configurable memory, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as conflict resolvers 302 and request generating code 204, in the form of data 118 and instructions 116, read from a removable medium 114 and/or another source such as a network connection, to form a configured medium. The configured medium 112 is capable of causing a computer system to perform process steps for transforming data through granular inventory management as disclosed herein. FIGS. 1 through 6 thus help illustrate configured storage media embodiments and process embodiments, as well as system and process embodiments. In particular, any of the process steps illustrated in FIG. 5 and/or FIG. 6, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

From a client perspective, some approaches proceed as follows. A client 126 receives multiple inventory management requests. Requests may be stored locally, such as in a WMI repository. Each request includes one or more action instances. A precedence, a timestamp, an action type, and one or more action details are associated with each action instance. In many cases, actions can be recurring, and include a running schedule 612. The client performs each action instance which occurs only once in the requests. If there are multiple instances per request, they can be merged or overridden by the conflict resolution if not decided on the server side.

A distinction can be made between requested and actual action requests. The requested request 206, 226, 304 is the raw request received from a server side (administrative device 120) or as a default, while the actual requests 502 are the action requests remaining after conflicts 606 are resolved. Actual requests are applied, based on conflict resolution strategy. For each action instance whose action type occurs more than once in the requests, the client performs the action details for the action instance which has the highest precedence; if two or more action instances have the same precedence, then the client performs the action details for the action instance which has the most recent timestamp. If two action instances have the same precedence and the same timestamp, then in some approaches the client reports an error.

In some approaches, however, there won't be any error at the client site. The conflict resolution is decided based on Key and Precedence, as well as the timestamp. If the action instance is not valid anymore, they're revoked and removed from the policy. Then the key of the action instance is evaluated, if there is no multiple instance with such key, then this action instance is kept and resolved as itself. If there are multiple instances with the same key as this, the one with highest precedence wins, and the client will perform that action instance. On the server side, an admin could decide which property of the action the admin wants the client to perform for conflict-resolution, and thus decide which property is the key, so as to control how to resolve the conflict in the client side. In some cases, server instructions set a key to prevent a conflict, when conflict resolution through merger is intended.

To further illustrate, here is an example. An R&D mobile phone client receives two inventory management requests. One is an R&D request and the other is a Mobile Phone request. The R&D request includes two action instances, which we'll call "collect installed software" and "set schedule to 3 days". The Mobile Phone request includes two action instances, which we'll call "set schedule to 30 days" and "collect battery info". The "collect installed software" action instance has precedence of 4. The "set schedule to 3 days" action instance has precedence 3, action type "set schedule", and action detail "3 days". The "set schedule to 30 days" action instance has precedence 2, action type "set schedule", and action detail "30 days". The "collect battery info" action instance has precedence 1. In this example, lower numbers mean higher precedence. The timestamps are not relevant to this example. The "collect installed software" action has action type "collect install software", and action details "Software Code, collect software name, Install Date"; the "collect battery info" action instance has action type "collect battery info", and action details "collect Device ID, Availability, Battery Status".

The client performs each action instance which occurs only once in the requests, namely, "collect installed software" and "collect battery info". The action type "set schedule" occurs more than once, so the client resolves the conflict by performing the action instance which has the highest precedence, namely, "set schedule to 30 days". That is, this action type has the same key, so precedence is involved to performance conflict resolution.

This is only an example. In a given implementation, the order in which action instances are performed may be different from the order given here.

In one variation, the client has one or more initial requests already in place, before the R&D request and the Mobile Phone request arrive. For example, the client may have default inventory management settings. These initial requests are treated like received requests in the steps above. That is, the initial requests are merged and/or conflict resolved with the received requests.

The following discussion is derived in part from Collection-Based Inventory Design documentation of Microsoft Corporation. Aspects of a collection-based inventory program and/or documentation are consistent with or otherwise illustrate aspects of the embodiments described herein. However, it will be understood that collection-based inventory documentation and/or implementation choices do not necessarily constrain the scope of such embodiments, and likewise that collection-based inventory software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

One approach includes adding an inventory class 216 settings 220 dialog to an administrator console user interface, thereby allowing a user 104 to choose inventory classes that will be assigned to a settings object. Conflict resolution 608 is done on the client side, as opposed to the server side. In one approach, conflicts are resolved by a PolicyEvaluator Endpoint, which enumerates all settings instances in order based on PolicyPrecedence, adds to a string-to-instance Map, using a property with a RealKey qualifier as map key, and overrides if an instance with the same key exists. Conflict resolution can be controlled by the server side, e.g., by setting PolicyPrecedence.

In some approaches, an Inventory/Class report is added to a WMI Provider, and changes to implement the settings in granular inventory management. Inventory classes and their properties and reports are added (e.g., to a Microsoft® ConfigMgr sms-def.mof file), and inventory action IDs are added to an agent (e.g., to SMS_HardwareInventoryAgentConfig). Procedures such as spInsertInventoryReport, spInsertInventoryReportClass, and spInsertInventoryReportClassProperty are added to a store procedure for a WMI or other agent 504 class. Items such as a v_InventoryClass and v_InventoryClassProperty are added to a SQL View for the WMI or other agent class. CSspInventoryClass is added to SMS_InventoryClass, and CSspInventoryReport is added to SMS_InventoryReport. SMS_Report handling logic is changed consistent with the foregoing.

In some approaches, default settings (acting as default requests 304) are added to an Install.Map, SC_ClientComponent_Property, SMS_SCI_ClientComp, and default inventory data items are populated. For example, one default setting in install.map looks like the following, with the bold item added to support default requests 304:

```
Under depot\sms\SiteServer\setup\setup\Install.map
BEGIN_CLIENT_COMPONENT
    <Hardware Inventory Agent>
    <0>
    CLIENT_SOURCE_DIRECTORY <hinv>
    PDF <hinv.sms>
        SITE_KEY_FLAGS <1>
......
PROPERTY <Inventory Schedule><REG_SZ><0001200000100038><0>
    PROPERTY <Maximum 3rd Party MIF
    Size><REG_DWORD><><250>
    PROPERTY <Provider Timeout><REG_DWORD><><60>
    PROPERTY <MIF Collection><REG_DWORD><><0>
    PROPERTY
    <InventoryReportID><REG_SZ><{00000000-0000-0000-0000-
    000000000001}><0>
    UNIT <SMS>
END_CLIENT_COMPONENT
```

LastUpdateTime for InventoryAction is updated to trigger a default setting policy. A new InventoryAction per Setting is added to support custom settings 220. Custom settings are triggered by an update to StringValue in ClientAgentProperty_Value, and are also supported by CHardwareInventorySettingsObj::GetPolicyXML. An Inventory Agent Message Handler is modified, and Policy Setting structure is modified, to support requests 206 as described herein.

In some approaches, live capture of classes 216 with WMI or other software is supported to obtain 648 live-reference data 510. From a user 104 perspective, one scenario is that the user clicks a browse button. A connection dialog pops up, allowing the user to specify a system name and credentials. After clicking a connect button, a list 214 of WMI classes inside the specified system is show, and the user can click a check box to capture WMI class definitions.

In some, live capture of inventory settings 220 is supported. After a WMI definition is captured, an administrator or other user 104 can use a dialog to change on/off settings for the selected WMI class 216. In some, it is also possible for the user to turn on/off 634 particular class properties 218, so that results 506 are only collected for some of the properties 218. For a CDROM Drive (Win32_CDROMDrive) class 216 for example, one might turn on these properties: Device ID, Availability, Caption, Description, Drive, and turn off the rest of the properties, such as Capabilities, CapabilityDescriptions, CompressionMethod, and so on.

Some approaches support live capture assignment as follows. One built-in default settings 220 will be applied to the whole system 101. An admin 104 could also create several custom settings 220, with each custom setting corresponding to a specific inventory collection requirement. For example, R&D and Sales departments could have different inventory collection criteria. Criteria could also differ for desktop computers 212 versus mobile devices 210, and the IT policy of the organization may not be the same throughout the organization.

After the settings are created, each setting is assigned an order number (a precedence 408), which will affect the conflict resolution results. For example, in one approach, the lower the order number is, the higher the priority is that these settings will be kept and applied. Each setting 220 can be assigned or target to one or more collections (groups 640). Computers and/or other devices 122 inside these collections will then be treated with the settings assigned to their collections.

Some approaches involve live capture from registry values. The administrator browses to a reference device (e.g., a Microsoft® Gold System or other system containing live-reference data 510) by typing a computer name and then clicks a Connect button (mark of Microsoft Corporation). The admin selects a registry key in a GUI, and selects the specific registry value to collect. After the admin clicks OK, the definition (schema) of the registry value(s) are retrieved and converted to Inventory Schema definition and saved into the system 101.

Some approaches involve live capture of MOF/MIF files, that is, Managed Object Format/Management Information Format files. An admin 104 could click Import, which pops up a standard file browse dialog box, allowing the admin to select a sample MOF/MIF file from a local computer or from the file sharing locations of the system. The software 124 parses the sample file, and then summarizes the inventory schema information retrieved from the sample file, for the admin to confirm. After the admin clicks Import, the inventory schema retrieved from the sample file is saved into the system 101 as part or all of an inventory schema definition.

In some approaches, WMI schema editor(s), MIF file schema editor(s), registry schema editor(s), third party schema editor(s), WMI schema provider(s), MIF file schema provider(s), registry schema provider(s), and/or third party schema provider(s) support inventory class 216 picker functionality. An inventory report provider, and an inventory management SDK, may also be present.

In some approaches, a Policy Agent which has a mechanism for resolving conflicts at the WMI instance level for collection variables is used and extended to resolve Settings conflicts. To handle conflicts 606 for collection variables, polling interval, etc., a property PolicyPrecedence was added to CCM_Policy. When there are instances of the same WMI class from the same source, PolicyPrecedence is used to determine which instance to use.

Without requiring that Settings only be created at a single central location, one cannot readily ensure that each Setting has a unique precedence across the hierarchy. Therefore, a new property to CCM_Policy is introduced, namely, the timestamp for when the policy was created. By default this property will be NULL. The policy agent is modified to use this property, if it is not NULL, to break ties (resolve 608 conflicts) when multiple instances have the same source and PolicyPrecedence.

Since each client component stores its configuration in its own WMI class derived from CCM_Policy, conflict resolution will be at the client component level. For example, assume that the client receives two Settings objects, A and B, and A has higher precedence than B. A contains settings for the Remote Tools component. B contains settings for Remote Tools and Software Distribution. The resultant settings will be: Remote Tools settings from A and Software Distribution settings from B. These conflict-resolved settings 220 correspond to requests 502 that are actually applied (performed) at the client.

In some approaches, the WMI schema for the server classes which store client component settings mirrors the schema for the client classes from which the agents retrieve their configuration data. This may make the unit of conflict resolution more clear.

Some additional particular implementation details, which are useful in some approaches but not necessarily required in any (or every) embodiment, are as follows.

SCCM Database

ClientAgent

This table contains one row per client agent and is populated by setup. It is referenced by entries in "Error! Not a valid bookmark self-reference" to indicate which client agent a property is associated with.

ClientAgentProperty

Each row contains one client agent property, and a reference to the ClientAgent table indicating to which the property belongs. This table is populated by setup.

ClientAgentProperty_Value

This table contains values for client agent properties. It contains a foreign key into the ClientAgentProperty table indicating which property the value is for, and a foreign key into the ClientSettings table indicating which settings object this property value belongs to.

ClientSettingsAssignments

This table stores the assignments of Settings objects to collections. Policy assignment body is stored in PolicyAssignment.

SDK Provider

New classes will be added to the SDK provider to manage Settings Objects and Settings Assignments.

One added class is SMS_InventoryClass, along the following lines:

```
[
    Description("This class is embedded by SMS_InventoryClass and represents a property included in the class."),
    Embedded,
    Read
]
class SMS_InventoryClassProperty
{
    [not_null]
    string      PropertyName;
    [not_null]
    uint32      Type;
    [not_null]
    uint32      IsKey;
    [not_null]
    string      Units;
};
[
    Dynamic,
    Provider("ExtnProv"),
    DisplayName("Hardware Inventory Class"),
    Read
]
class SMS_InventoryClass
{
    [not_null]
    string      Namespace;
    [not_null]
    string      ClassName;
    [key]
    string      SMSClassID;
    [not_null]
    string      SMSGroupName;
    [lazy]
    SMS_InventoryClassProperty Properties[ ];
};
```

Another added class is SMS_InventoryReport, along the following lines:

```
[
    Description("This class is embedded by SMS_InventoryReport and represents an instance of a class to include in the report."),
    Embedded
```

```
]
class SMS_InventoryReportClass
{
    [key]
    string      SMSClassID;
    string      Filter = null;
    [not_null]
    uint32      Timeout = 600000;
    [lazy]
    string      ReportProperties[ ];
};
[
    Dynamic,
    Provider("ExtnProv"),
    DisplayName("Hardware Inventory Report"),
    Secured
]
class SMS_InventoryReport : SMS_BaseClass
{
    [key]
    string      InventoryReportID;
    [not_null]
    string      Description;
    [not_null]
    uint32      DefaultTimeout = 600000;
    [not_null]
    uint32      ReportTimeout = 4838400;
    [lazy]
    SMS_InventoryReportClass ReportClasses[ ];
};
```

A third added class is SMS_HardwareInventoryAgentConfig, along the following lines:

```
class SMS_HardwareInventoryAgentConfig : SMS_ClientAgentConfig
{
    boolean     Enabled;
    string      Schedule;
    uint32      Max3rdPartyMIFSize;
    uint32      MIFCollectionFlags;
};
```

A third added class is SMS_SoftwareInventoryAgentConfig, along the following lines:

```
class SMS_SoftwareInventoryAgentConfig :
    SMS_ClientAgentConfig_BaseClass
{
    boolean     Enabled;
    string      Schedule;
    uint32      ScanInterval;
    uint32      ReportTimeout;
    uint32      QueryTimeout;
    uint32      ReportOptions;
    string      InventoriableTypes[ ];
    string      Path[ ];
    string      Subdirectories[ ];
    string      ExcludeWindirAndSubfolders[ ];
    string      Exclude[ ];
    string      CollectableFiles[ ];
    string      CollectableFilePaths[ ];
    string      CollectableFileSubdirectories[ ];
    string      CollectableFileMaxSize[ ];
    string      CollectableFileExclude[ ];
};
```

Policy Provider

The Policy Provider may manage client component settings based on data from a site control file. Policy Provider code can be modified to read settings data from the new tables based on Settings Object instances. The XML generated for the policy bodies will not necessarily change.

In one approach, the following classes and functions are removed, modified, or added in the Policy Provider codebase.

MIF Support

NOIDMIF

NOIDMifs are reported as part of hardware inventory. The "collect noidmif" setting is set on the site server, which policypv turns into a SMS_MIFGROUP query in policy for client hinv actions. The custom MIF Provider is a dynamic provider for SMS_MIFGROUP on the client, supplies results for inventory agent query, and returns the MIF contents in a format that is easy for the MP to translate into MIF groups and attributes.

An Inventory Agent may also provide support for the reporting of data exposed thru NOID MIF files. This can be accomplished through a new provider—the SMS MIF provider. The provider will parse NOIDMIFs at a set location, parse the file(s) and expose the groups and attributes through a generic WMI instance interface. This allows NOIDMIF data to be collected as any other WMI data in the inventory agent report.

IDMIF

IDmifs are reported via a separate inventory action and report—if IDMIF collection is enabled on the site, then an idmif file collection action is added to policy and executed by the inventory agent. IDmifs on the client are collected and attached to the report, and sent to the Relay Manager for processing and redirection to invproc on the site server.

The new Inventory Agent will offer basic support for collecting and reporting ID MIF files. These files will be collected by a FileCollectionAction and associated CollectableFileItem. The policy for the action and item will be turned on by the policy provider based on the site's hardware inventory settings.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 5 and 6 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor in at least one managed device of an inventory-managed system causes the processor(s) to perform a process for inventory management, the process comprising the steps of:

electronically receiving multiple inventory management requests in a device memory of the managed device, the received inventory management requests including at least one action instance and at least one action key, each action instance having at least an action type, action detail(s), a precedence, and a sequence number;

computationally through execution of at least some of the instructions by at least one processor of the managed device identifying a conflict at an application client level in that received inventory management request(s) contain respective action instances having the same action type but having different and mutually inconsistent action detail(s);

computationally through execution of at least some of the instructions by at least one processor of the managed device resolving the conflict at the application client level in favor of one inventory management request action instance, based at least on an action instance precedence; and transmitting from the managed device at least one result of the inventory management request action instance in whose favor the conflict was resolved, wherein the at least one result comprises a result of applying at the managed device an action instance of at least one of the following action types: gathering statistics, specifying a recurrence schedule, getting a version number, getting an installation date, or collecting battery information.

2. The configured medium of claim 1, wherein resolving the conflict is based on at least one of the following: an action instance precedence and action instance sequence numbers; an action key; a merge specified with an action key; an override specified with an action key.

3. The configured medium of claim 1, further comprising computationally performing the action instance in whose favor the conflict was resolved.

4. The configured medium of claim 1, further comprising computationally performing an action instance which occurs only once in the received requests.

5. The configured medium of claim 1, wherein the action detail(s) include a schedule for a recurring action.

6. The configured medium of claim 1, further comprising computationally determining that an action instance is no longer valid, and revoking the action instance.

7. The configured medium of claim 1, wherein the receiving step comprises receiving a locally stored request from a default inventory policy.

8. The configured medium of claim 1, wherein the receiving step comprises receiving a transmitted request from an administrative device across a network connection.

9. The configured medium of claim 1, wherein the process further comprises obtaining over a network at an administrative device an electronic report containing inventory report results from inventory management requests which were actually applied at target devices, as opposed to inventory management requests which were sent to the target devices but not actually applied.

10. The configured medium of claim 9, wherein the obtaining step obtains a conflict-resolved result in response to conflicting inventory management requests sent from the administrative device.

11. The configured medium of claim 9, wherein the obtaining step obtains a result from a default inventory management request.

12. The configured medium of claim 1, wherein the process further comprises specifying an action key for inventory management requests, the action key specifying at least one merger property.

13. The configured medium of claim 1, wherein the process further comprises specifying an action key for inventory management requests, the action key specifying at least one override property.

14. The configured medium of claim 1, wherein the process further comprises turning off a property, and wherein a result for that property is not present in the obtained report.

15. The configured medium of claim 1, wherein the process further comprises computationally resolving conflicts between inventory requests which have the same action type but different action detail(s).

16. The configured medium of claim 1, wherein the process comprises inventory management for an enterprise-level number of managed clients, namely, at least one thousand managed clients.

17. The configured medium of claim 1, wherein the process complies with at least one of the following standards: Web-Based Enterprise Management, Common Information Model.

18. The configured medium of claim 1, wherein the process resolves conflicts based on action instance precedence and request sequence number.

19. The configured medium of claim 1, wherein the process sets an action key at an administrative device to prevent a conflict, when conflict resolution through merger is indicated.

20. The configured medium of claim 1, wherein the process comprises inventory management for at least one of the following: a plurality of mobile target devices in whose memories respective clients reside, a plurality of computer target devices in whose memories respective clients reside.

* * * * *